Oct. 13, 1936. D. E. LINDQUIST ET AL 2,057,038
FITTING AND METHOD OF MANUFACTURING THE SAME
Filed Aug. 10, 1935 2 Sheets-Sheet 1
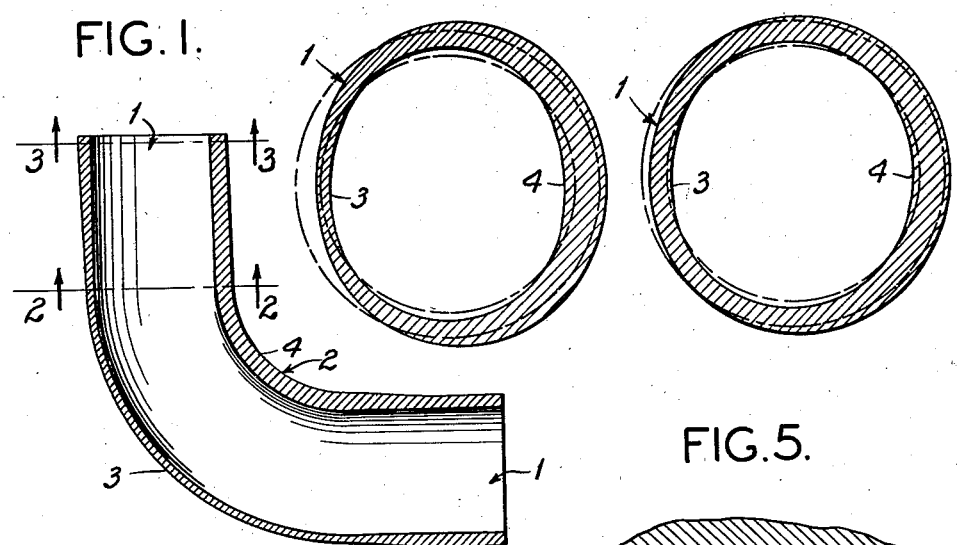
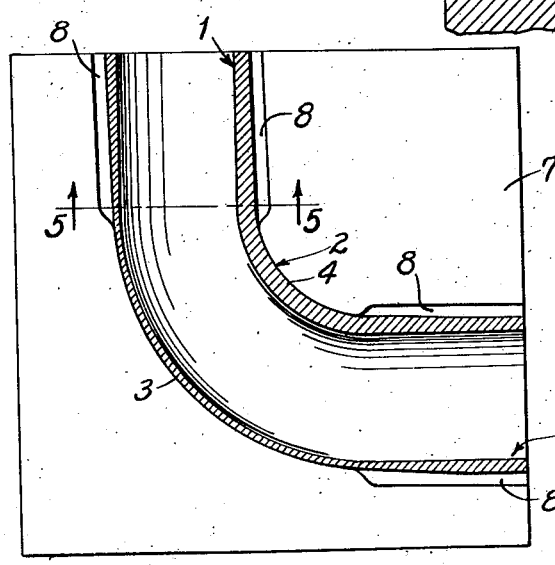
David E. Lindquist,
Arthur W. Brown,
Ernest Whybrew,
Inventors,
Delor T. Haynes
Attorney Oct. 13, 1936. D. E. LINDQUIST ET AL 2,057,038

FITTING AND METHOD OF MANUFACTURING THE SAME

Filed Aug. 10, 1935 2 Sheets-Sheet 2

David E. Lindquist,
Arthur W. Brown,
Ernest Whybrew,
Inventors.
Dolor G. Haynes,
Attorney Patented Oct. 13, 1936

2,057,038

UNITED STATES PATENT OFFICE 2,057,038

FITTING AND METHOD OF MANUFACTURING THE SAME

David E. Lindquist, Arthur W. Brown, and Ernest Whybrew, Port Huron, Mich., assignors to Mueller Brass Co., Port Huron, Mich., a corporation of Michigan Application August 10, 1935, Serial No. 35,558

2 Claims. (Cl. 29—157)

This invention relates to fittings, and the manufacture thereof, and with regard to certain more specific features, to pipe fittings.

Among the several objects of the invention may be noted the provision of a pipe fitting which is formed by shaping a suitable length of metallic tubing, in such a manner that the ends of the fitting are accurately sized to close internal tolerances, whereby the fitting may be used for effecting a solder-type joint; and the provision of a method of manufacturing fittings of the class described which is particularly adapted to take into account the irregularity of the fitting inherently formed as an incident of the manner in which it is manufactured, and to correct such irregularities so that the fitting, when finished, is held to close tolerances and accurate size. Other objects will be in part obvious and in part pointed out hereinafter.

The invention accordingly comprises the elements and combinations of elements, steps and sequence of steps, features of construction and synthesis, and arrangements of parts, which will be exemplified in the structures and processes hereinafter described, and the scope of the application of which will be indicated in the following claims.

In the accompanying drawings, in which are illustrated several of various possible embodiments of the invention, Fig. 1 is an axial section of an incompleted L fitting, or bend, showing certain irregularities in wall thickness and cross section in exaggerated form for purposes of illustration;

Fig. 2 is an enlarged cross section taken substantially along line 2—2 of Fig. 1;

Fig. 3 is an enlarged cross section taken substantially along line 3—3 of Fig. 1;

Fig. 4 is a vertical cross section of the fitting of Fig. 1 positioned in a pair of swedging jaws, prior to a swedging operation;

Fig. 5 is an enlarged horizontal cross section taken along line 5—5 of Fig. 4;

Similar reference characters indicate corresponding parts throughout the several views of the drawings.

Figure 6:
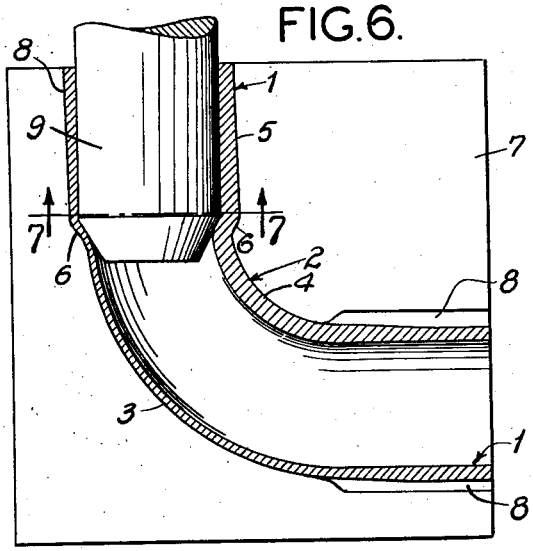
Fig. 6 is a view similar to Fig. 4, illustrating the apparatus at the completion of a swedging operation.

With a certain type of pipe fittings, such as the angle fittings and return bends (which are essentially angle fittings wherein the angle is one hundred and eighty degrees), it has been found economical to conduct the manufacture by forcing a length of more or less ductile metal tubing through a curved die, in such manner as to bend the tubing without substantially injuring its cylindrical shape. This method of manufacture is not per se the subject of the present invention. On the other hand, the present invention recognizes irregularities which are inherently produced in the various specific embodiments of this general method and provides a further method whereby such irregularities may be corrected to produce a fitting needing close tolerances and having accurate final dimensioning and sizing.

Fittings of the class described are used principally for making joints with pipe lengths or the like, by means of a solder or other sealing material, in contradistinction to threaded joints. Such a soldered joint, for example, is shown in the patent to Charles A. Hill, No. 1,770,852, dated July 15, 1930. For the satisfactory manufacture of such joints, it is, however, essential that the portions of the fittings which receive the pipe ends be sized to very close tolerances, and must be maintained with accurate circular cylindricity in the interior face thereof, otherwise the solder introduced to form the joint will not flow evenly and a leaky joint may result.

The irregularities which are inherent in the generic class of fittings manufactured by bending tubing are indicated in Figures 1, 2, and 3. Fig. 1 indicates an incompleted ninety-degree angle fitting. It has substantially cylindrical end portions 1, and a central bent portion 2. By reference to Fig. 1, it will be seen that the method of manufacture has resulted in a stretching or thinning-out of the metal on the outside of the bend portion 2, indicated at numeral 3, and a corresponding thickening of the metal on the inside of the bend, indicated at numeral 4. Thus, the fitting is uneven in wall thickness. This irregularity persists to some extent all the way to the ends of the cylindrical portions 1, although it becomes less aggravated as the ends are approached. Not only are the wall thicknesses of fittings thus made irregular, but the method of manufacture usually results in the cylindrical end portions 1 being slightly out of true circularity. This feature is indicated in Figures 2 and 3. In these figures, the dotted lines serve to indicate true circularity as well as uniform wall thickness. The considerable variance from true circularity and uniform wall thickness is pronounced, as will be seen. It will also be seen from the relative differences of Figures 2 and 3, how the irregularities are greater on the portion of the cylindrical sections 1 nearer the curved section 2.

It is customary, in fittings of this sort, to provide the ends of the fittings with belled-out portions or sockets to receive in telescoping fits the pipes or other inserted members for making the joints. Such a socket is indicated at numeral 5 in Fig. 8. It will be seen that it comprises substantially all of the cylindrical portion 1 and terminates with a shoulder 6.

Ordinarily, the socket portions thus described are formed by swedging the blank, as illustrated in Fig. 1, in suitable swedging apparatus comprising a split die and a punch.

Such a die, for example, is indicated at numeral 7 in Fig. 5. Numeral 8 indicates the enlarged portion of the die into which metal is to be forced to make the end socket. Heretofore, it has been the custom to make the enlarged portion 8 truly circular and cylindrical, and with its axis on the major axis of the fitting itself. The swedging punch, as indicated by numeral 9 in Fig. 7, was likewise truly circular and cylindrical, and coaxial with the portion 8 and the major axis of the fitting. When such apparatus was used on fitting banks having irregularities such as those indicated in Fig. 1, the result of the swedging operation was that neither circularity nor uniform cylindricity of the end socket was obtained. This was inherent, because the punch 9 encountered heavier metal on one side, and lighter metal on the other side, and thus it was misdirected and caused the fittings to warp into an irregular contour instead of making the fittings conform closely to the region between the die and the punch.

Figure 7:
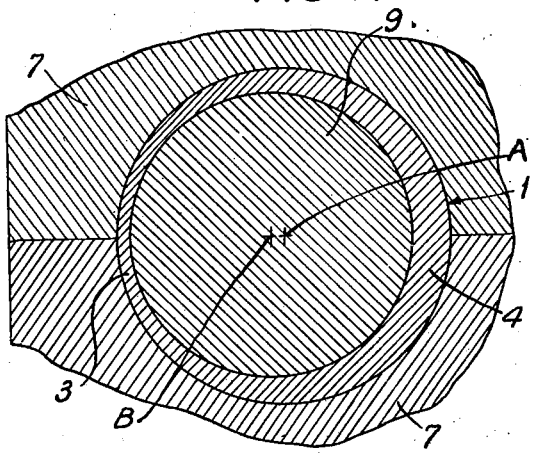
Fig. 7 is an enlarged horizontal cross section taken substantially along line 7—7 of Fig. 6.

The present invention solves this difficulty by initially taking into account the irregularity of the fitting blank, and so positioning the axis of the opening 8, and the axis of the punch 9, with respect to the axis of the fitting, that when the punch is brought into the dies, the interior of the end of the fitting is immediately brought to true circularity and true cylindricity and accurate dimensions. This is accomplished by slightly shifting the axis of the punch 9, in the plane of the fitting, toward the outside of the turn of the fitting. The punch 9 is cylindrical, with a truly circular cross section. The opening 8 is likewise cylindrical, with a truly circular cross section. However, the center of the opening 8, indicated by letter A in Fig. 7, is slightly displaced to the right from the center of the punch 9, indicated by letter B.

When the punch and dies as thus constituted are operated upon a fitting of the type shown in Fig. 1, there is no tendency for the metal of the fitting to buckle. The inner face of the socket portions 5, instead of being off round, is truly cylindrical and truly circular. The same is true of the outer face of the socket blank. The wall thickness around the cross section of the socket is non-uniform, but this is an inconsequential point. It is by recognizing the non-uniformity of wall thickness, and taking it into account, that the true circularity and cylindricity of the inside face of the socket portion are obtained.

Figure 8:
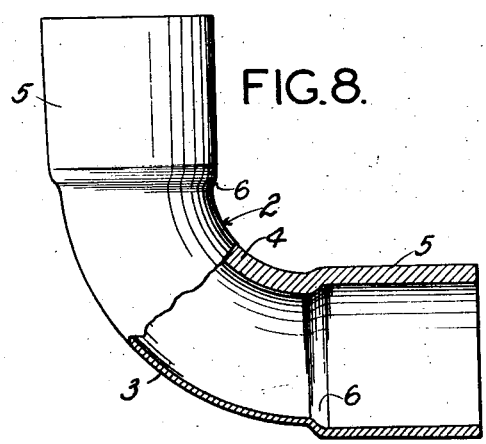
Fig. 8 is a side elevation, partly in section, of a completed L fitting or bend.

In Fig. 8 is indicated the completed angle fitting made according to the present invention. Both socket portions 5 have perfectly circular, cylindrical, inner faces. They are best adapted for the ready making of a good, leak-proof joint, in the manner set forth in the said Hill patent.

Figure 9:
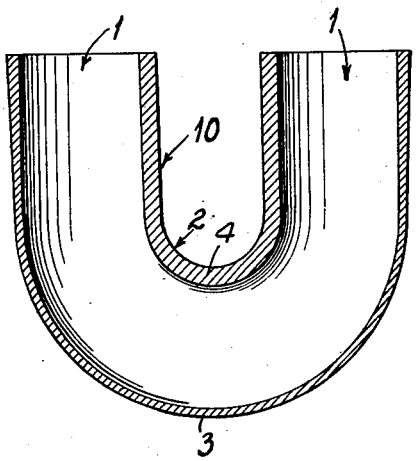
Fig. 9 is an axial section similar to Fig. 1 but illustrating a return bend fitting; and, Fig. 10 is a side elevation, partly in section, of a completed return bend fitting.
Figure 10:
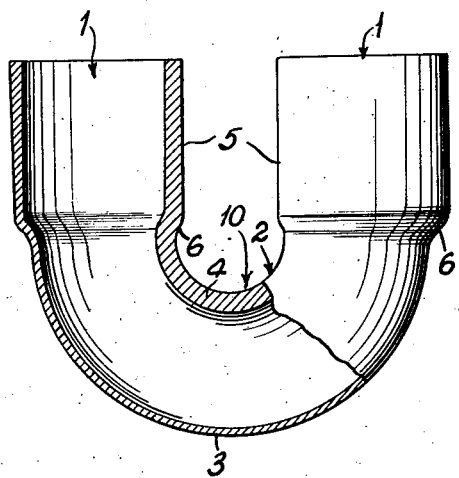

In the case of the return bend the irregularities of wall thickness and circular shape are even more evident than in the case of the ninety-degree bend heretofore described. A return bend 10 is shown in Fig. 9, where these irregularities are clear per se. However, by using the principle of the present invention, as shown in Figs. 4, 5, 6, and 7, with suitable dies for the return bend, the end portions or sockets 5 of the return bend can be made truly circular and truly cylindrical on their interior faces, as is desired. A completed return bend having such characteristics is shown in Fig. 10.

Throughout the drawings of this application, the irregularity of shape and thickness have been exaggerated for purposes of illustration. However, the exaggerated irregularities are representative of relatively lesser irregularities that actually are found in the fittings as manufactured in the manner described.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. The method of forming socket portions on the ends of fitting blanks made by bending tubing, comprising swedging the ends of said fittings in such a manner as to take account of the irregularity in shape and wall thickness of said ends, whereby the interior faces of said socket portions are made truly circular and truly cylindrical, comprising placing said fitting in a pair of split swedging dies, said dies having openings adapted to form said socket portions, and pressing a punch into said fitting in the dies, the axis of said punch being displaced from the axis of the corresponding opening in the dies in amount sufficient to compensate for irregularities in wall thickness of the fitting blank.

2. A pipe fitting comprising a length of bent tubing, said pipe fitting having expanded socket portions on its ends, said expanded socket portions having inner faces which are truly circular and truly cylindrical throughout their length, the wall thickness of said socket portions varying therearound, and the outer face of said socket being likewise truly circular and truly cylindrical, but having an axis displaced from the axis of the inner face.

DAVID E. LINDQUIST.
ARTHUR W. BROWN.
ERNEST WHYBREW.